Nov. 4, 1969  I. ADLER ETAL  3,476,233
ROTARY PLOW FEEDER APPARATUS

Filed Feb. 6, 1968  2 Sheets-Sheet 1

INVENTORS
IMRE ADLER
FRITZ F. STRENG

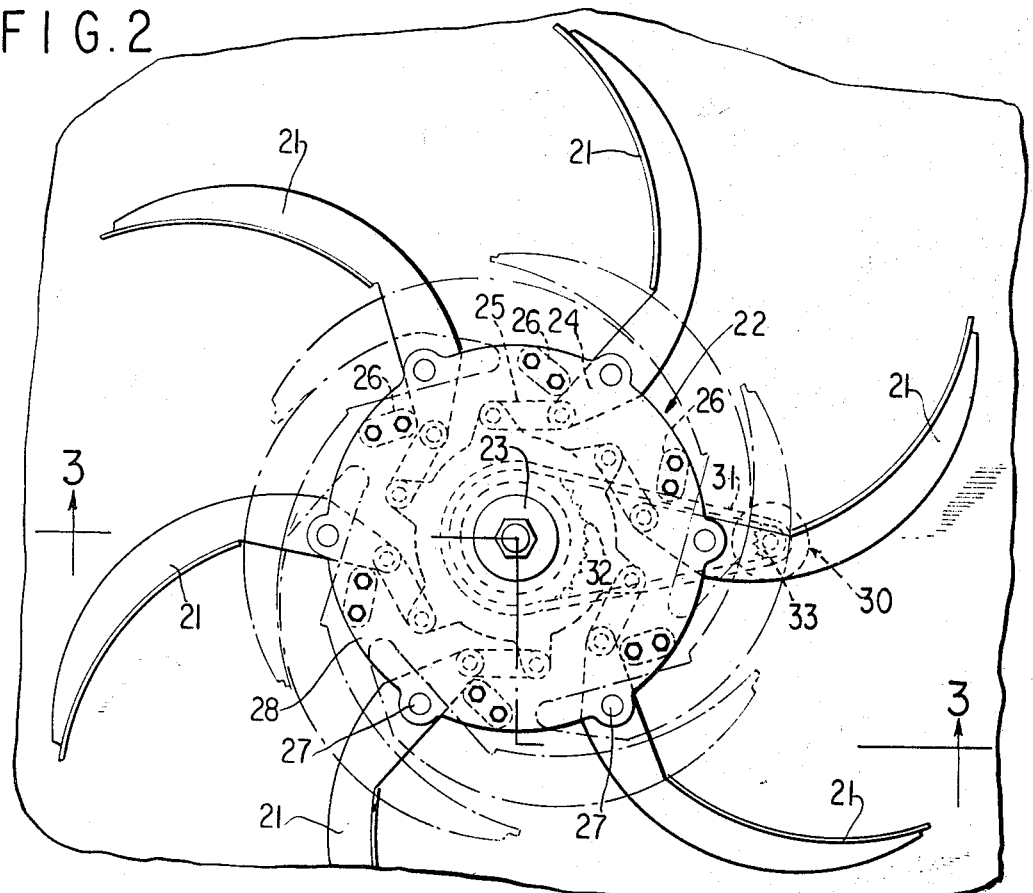
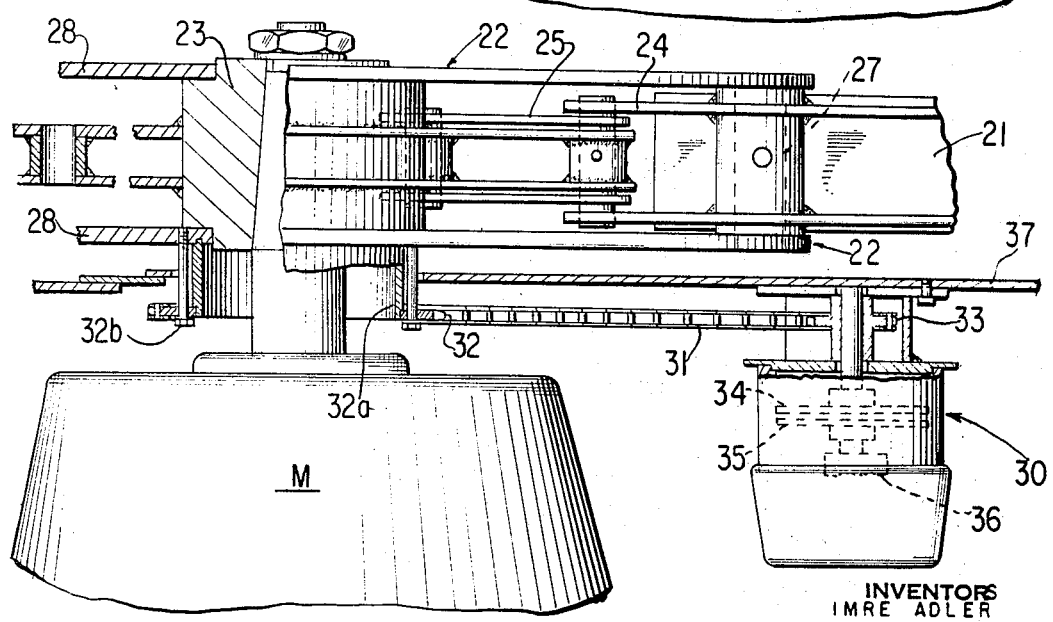

United States Patent Office
3,476,233
Patented Nov. 4, 1969

3,476,233
ROTARY PLOW FEEDER APPARATUS
Imre Adler, Verona, and Fritz F. Streng, Elizabeth, N.J., assignors to Hewitt-Robins Incorporated, Stamford, Conn.
Filed Feb. 6, 1968, Ser. No. 703,386
Int. Cl. B65g 47/82
U.S. Cl. 198—212                                 5 Claims

ABSTRACT OF THE DISCLOSURE

A rotary plow feeder apparatus for reclaiming bulk mounted on a rotatable ring member concentrically surrounding a driven hub member. The hub and ring members are connected by a number of links or rods each of which has one end pivotally attached to the hub and the other end to one of the blades carried by the ring assembly. When the hub and ring assembly move relative to each other in one direction all of the blades are simultaneously extended by the links, and relative movement of the hub and ring assembly in the opposite direction causes all of the blades to be simultaneously retracted by the same links.

BACKGROUND OF THE INVENTION

Feeder-reclaimer apparatus is located in a tunnel over which the material to be reclaimed is stacked or stockpiled. As the feeder travels along the tunnel, the feeder blades, which extend through a slot in the tunnel, scoop material into a hopper moving with apparatus. The material is thereby fed onto a conveyor belt receiving material from the hopper and is subsequently delivered to a remote treatment or transit station.

It is frequently necessary to move the feeder from one place to another in the tunnel without extracting material from the stockpile. At such times it is necessary to place the blades in a stowed position.

Further it is sometimes desirable to place a rotary plow feeder in a position inclined from the horizontal for example, when a rotary plow feeder is installed in a self unloading vessel, as described in copending application Ser. No. 666,736. With this type of an inclined feeder it is necessary to lock each blade in its retracted position so that the lower blades will not be accidentally extended by the force of gravity when the feeder is being relocated in another operative position along the length of the tunnel.

It has also been proposed, for example, in copending application Ser. No. 625,186, which has matured into Patent No. 3,401,787, to provide a mechanism for positively moving the blades between extended and retracted position from a remote location. However, in the proposed apparatus the blades are not locked in the retracted position so that such a proposal is not practical for inclined feeders because a previously retracted blade can be accidentally extended by gravitational forces and begin feeding material that is not desired.

Other proposals have also been made for moving blades of a rotary plow feeder which will also lock the blades in retracted position. However, these arrangements have been complex and expensive as well as unreliable, or too delicate for operation in the environmental conditions existing in a tunnel. That is, an environment which may be heavily laden with dust, moisture and in some cases subject to freezing conditions.

SUMMARY OF THE INVENTION

The above enumerated disadvantages and shortcomings of previously known apparatus are overcome by the apparatus according to this invention in that the feeder blades are positively extended and retracted by the direction of rotation of the motor driving the plows so that a known reversible motor may be used which may be readily known reversable motor may be used which may be readily controlled from a remote station. The plow feeder according to this invention also provides a positive movement of all blades simultaneously, so that the feeder may be readily operated in an inclined position, and when the feeder is inclined the blades in retracted position are held securely against accidental movement to an extended position. The rotary plow feeder according to this invention therefore is most advantageously utilized in self unloading vessels because in an inclined position the blades can be securely held in retracted position. Obviously such a feeder can be operated in a horizontal position as well and as a result the invention provides a rotary plow feeder apparatus having universal utility.

An object of the invention therefore is to provide an improved retractable blade mechanism for a rotary plow feeder apparatus having remotely controlled, positively retractable blades to facilitate movement of the feeder.

Another object of the invention is to provide a rotary plow feeder having a plurality of pivotal blades which are all simultaneously moved between an extended and a retracted position from a remote location.

A further object of the invention is to provide a rotary plow feeder having a plurality of pivotal blades which are all moved simultaneously from an extended position to a retracted position and in which the blades are positively held against accidental movement out of the retracted position.

A further object of the invention is to provide apparatus according to the foregoing objects which is simple in operation, economically manufactured, and reliable under the adverse environmental conditions normally encountered in operation thereof.

A further major object of the invention is to provide a rotary plow feeder having particularly advantageous utility in self unloading vessels.

BRIEF DESCRIPTION OF THE DRAWINGS

FIG. 2 is a top plan view of a feeder plow incorporating the subject invention taken on line 2, 2 of FIG. 1.

FIG. 3 is a partial cross-sectional side elevation taken on line 3, 3 of FIG. 2.

DESCRIPTION OF THE PREFERRED EMBODIMENT

Figure 1:
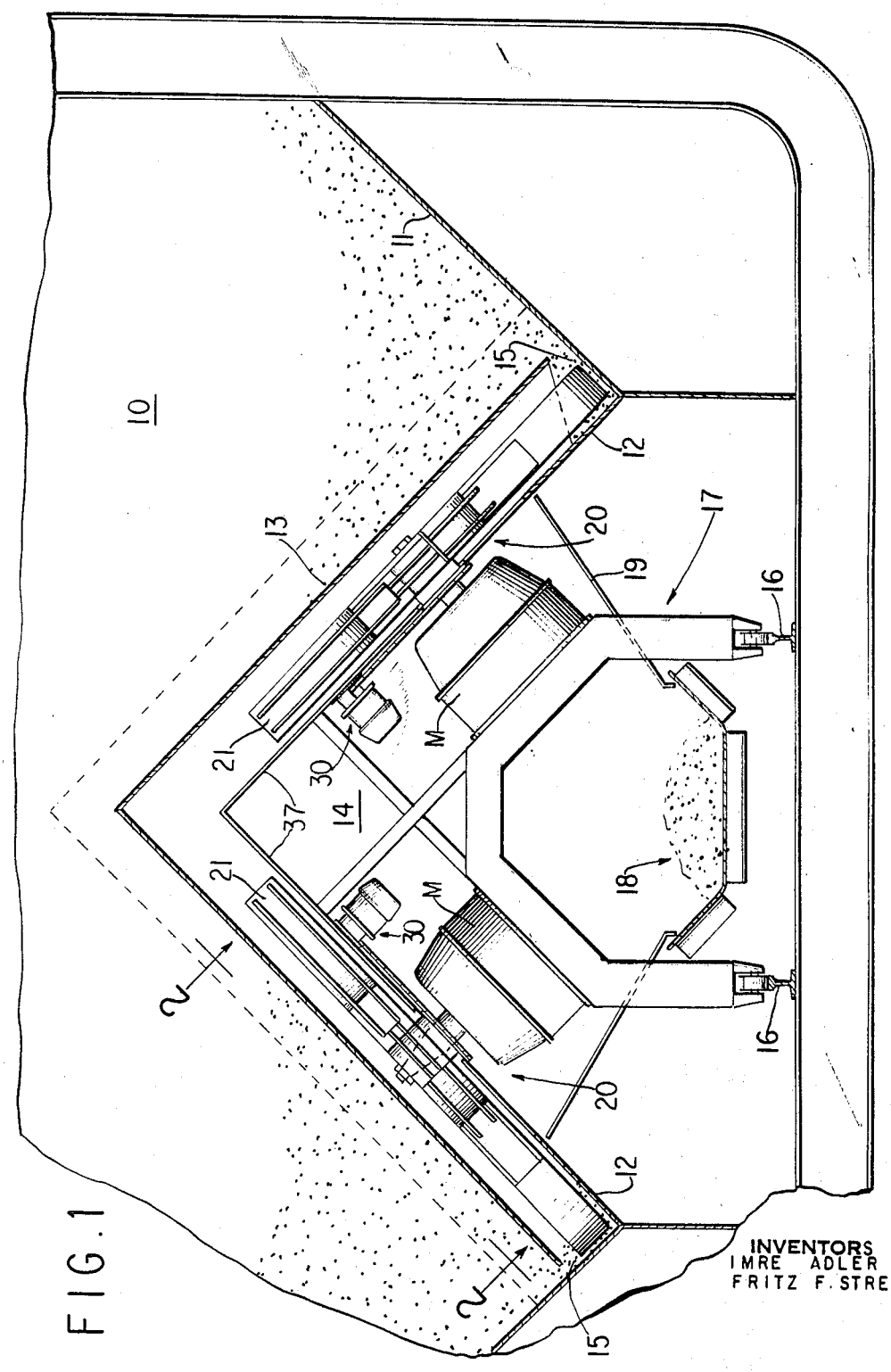
FIG. 1 is a somewhat diagrammatic cross-sectional elevation of the rotary plow feeder apparatus to which the subject invention pertains.

In FIG. 1 bulk material 10 has been built up in a pile within the storage area which may be within the hull of a self unloading barge or ship or on land. In either case the storage area has an inclined floor 11 which terminates in an inwardly and upwardly directed shelf 12. The roof 13 of the tunnel 14 overlies a portion of the shelf 12 thereby defining inwardly and upwardly inclined openings 15 on both sides of the tunnel. The openings or slots 15 have a longitudinal extent substantially equal to the length of the tunnel roof, however the roof 13 of the tunnel and the inclined shelf 12 are constructed and arranged so that none of the bulk material 10 can flow freely past shelf 12 and into the tunnel 14.

A pair of rails 16 extend the length of the tunnel 14 and over which a self-propelled carriage 17 of known construction moves. Thus, the carriage 17 is adapted to travel, in either direction, from one end of tunnel 14 to the other. Extending throughout the length of the tunnel 14 is a moving conveyor belt 18 which is also of known construction. Mounted on the carriage 17 is a hopper 19, a pair of back plates 37, and a pair of rotary plow feeders generally designated 20. The plates 37 move with the carriage 17 but are otherwise fixed. Each of the feeders 20 have a plurality of curved blades 21 which are located below the roof 13 of the tunnel and extend through the openings 15 into the bulk material. As shown in FIG. 1 the blades 21 may extend to a point closely adjacent to the floor 11. The blades, which are driven by a suitable motor M pull material into the hopper 19 and it is deposited on the conveyor 18 as is well known.

FIG. 2 shows only one of the identical pair of feeders shown in FIG. 1.

As seen in FIG. 2 the blades 21 are pivotally connected or journaled at 27 to the periphery of a ring assembly 22 which concentrically surrounds the driven hub 23 of the feeder 20. The ring assembly 22 is supported on the hub 23 which is driven by motor M, however the ring assembly 22 is free to rotate independently on the hub 23. The ring assembly of the presently preferred embodiment consists of a pair of spaced plates 28 and the inner end of the blades 21 are received between these plates as best shown in FIG. 3. Each blade 21 is formed at its inner end with a crank arm section 24 in any suitable manner. The end of each crank arm section 24 is pivotally connected to a link 25 at one end and the other end of each link 25 is pivotally connected to the driven hub 23. Thus, the links 25, the bell crank end of the blades 21 and the journal 27 for each blade are located between the plates 28 of the ring assembly. It will be apparent from FIG. 2, that when the hub is rotated in a counterclockwise direction and the ring assembly 22 is held against rotation, that the links 25 will pull on the crank arms 24 until all the blades 21 are simultaneously pivoted into an extended position which is determined by the stops 26. When the blades 21 are fully extended and engaged with the stops 26 the ring assembly 22 is then pulled via the lings 25 and the journals 27, resulting in the unitary rotation of the hub 23, ring assembly 22 and the blades 21 at the same velocity as the driven hub 23.

As best shown in FIG. 3 the blade supporting ring assembly 22 is held against rotation by means of a brake assembly generally designated 30, which is secured to the relatively fixed carriage plate 37 (FIG. 1). The ring assembly 22 is connected to the brake assembly 30 by a chain 31 and sprocket 32 arrangement of any suitable construction. The sprocket 32 as shown in FIG. 3, is fixedly connected to the lower ring of the ring assembly 22 by a hub 32a and bolts 32b however any other arrangement may be utilized. The other sprocket, or brake sprocket 33, may be integral with or connected to a freely rotatable disc 34 which is engaged by a fixed brake disc 35 of known construction. A friction material surface is provided on one or both discs 34, 35 so that when the fixed brake disc 35 is moved against the rotatable brake disc 34 by known means such as a solenoid mechanism, the ring assembly 22 is braked. Thus, when the solenoid is deenergized the brake disc 35 engages the rotating disc 34 creating a drag or braking force on the rotatable disc 34 which, via the chain 31 and sprocket 32, places a drag or braking force on the blade support ring 22 whereby a relative rotational movement will exist between the hub 23 and ring assembly 22 thereby causing the links 25 and cranks 24 to rotate the blades 21. Also it should be noted that when the motor M is at rest, the brake is applied so that the retracted blades are locked against accidental movement.

OPERATION

Assume the blades of the rotary plow feeder are in a retracted position, motor M is motionless and the brake assembly 30 is deenergized, in which condition the brake discs 34 and 35 are engaged and rotation of the ring assembly 22 is prevented so that the blades cannot move. This is the normal position or condition of the brake assembly when the motor M is "off" and the plow feeder is being moved along the tunnel 14. In order to extend the blades, the motor M is energized so that the blade hub 23 rotates in a counterclockwise direction as viewed in FIG. 2. Since the ring assembly 22 is still held by the brake assembly 30, and the hub 23 and ring assembly 22 can turn relative to one another, all of the blades 21 will be forced positively to pivot into their extended or open position since the links 25 are pulling on the crank arms 24. When the blades are fully extended the brake 30 is energized or released by any known means such as a time delay switch or a stop switch (not shown) engaged by a blade when it is fully extended. Thereafter the ring assembly is driven by the links 25, bell cranks 24 and the housing of the journal 27 so that the hub 23 and ring assembly rotate as a unit. The sprocket 32 also drives the sprocket 33 via the chain 31 but the rotating disc 34 is disengaged from the fixed brake disc 35 so that no drag is imposed by the brake assembly 30 when the plow feeder is in full operation.

The switches and associated circuits for energizing and deenergizing the brake assembly 30 are conventional so that details thereof are omitted, it being understood that any suitable electric switches and circuitry can be utilized.

To retract the blades the rotation of the motor M is reversed so that the hub 23 rotates in a clockwise direction and the brake assembly 30 is deenergized by a time delay switch (not shown) which may be the same time delay switch that energizes the brake in its opposite position. When the brake is deenergized it causes the ring assembly 22 to be held against rotational movement and due to the clockwise movement of the hub the blades 21 are forced to retract since the links 25 are now pushing on the crank arms 24 as viewed in FIG. 2. When the blades are fully retracted a time delay switch or limit switch may be utilized to automatically turn off the motor which places the retracted blade feeder system in a condition for movement along the tunnel with the blades firmly held against accidental extension.

It is noted that the large diameter of sprocket 32, as compared with the brake sprocket 33, provides leverage for the small brake discs 34, 35 to overcome normal forces acting on the blades which could accidentally extend them.

The foregoing description of a presently preferred embodiment of the invention is given above; however the details described above may be varied or modified.

What is claimed is:

1. In a rotary plow feeder the improvement comprising a driven hub member rotatable about a given axis of rotation, a ring assembly concentrically surrounding said hub member, said ring assembly being rotatable about said given axis, a plurality of feeding blades pivotally mounted on said ring assembly and equi-angularly spaced from one another, linkage means interconnecting each of said feeding blades with said hub member, one end of each said linkage means being pivotally connected with one end of said blades, whereby upon relative movement of said hub and ring assembly in one direction, said blades are pivoted into an operative position by said linkage means and upon relative movement of said hub and ring assembly in an opposite direction said blades are pivoted into a stowed position; and brake means connected with said ring assembly for providing said relative rotation between said hub member and said ring assembly.

2. A rotary plow feeder according to claim 1 wherein said linkage means for each blade comprises a crank arm connected with each said blade at one end, a link member pivotally connected with said crank arm, said link member being pivotally connected at its other end with said hub member.

3. A rotary plow feeder according to claim 1 wherein said brake means comprises a sprocket connected with said ring assembly, a rotatable sprocket means, spaced from said sprocket and drivingly interconnected therewith by a chain means, friction means fixed against rotation and means for moving said friction means into engagement with said rotatable sprocket means whereby a braking force is applied to said ring assembly by said braking means.

4. A rotary plow feeding according to claim 1 in which said hub and ring assembly are mounted in an inclined position.

5. A rotary plow feeder according to claim 3 wherein said ring assembly comprises a pair of spaced parallel plate members rotatably supported on said hub member, means between said plate members for journaling each said blade therebetween; said crank arms, link members and the pivotal connections at each end of said link members being located between said plates.

References Cited

UNITED STATES PATENTS

| | | | |
|---|---|---|---|
| 1,778,533 | 10/1930 | Meyer | 214—15 |
| 3,401,787 | 9/1968 | Vaka | 198—36 |

GERALD M. FORLENZA, Primary Examiner

G. F. ABRAHAM, Assistant Examiner

U.S. Cl. X.R.

198—36; 214—15, 17

UNITED STATES PATENT OFFICE
CERTIFICATE OF CORRECTION

Patent No. 3,476,233                      November 4, 1969

Imre Adler et al.

It is certified that error appears in the above identified patent and that said Letters Patent are hereby corrected as shown below:

Column 1, line 12, after "bulk" insert -- material in which the feeding blades are pivotally --. Column 2, line 4, cancel "known reversable motor may be used which may be readily". Column 3, line 36, "lings" should read -- links --.

Signed and sealed this 15th day of September 1970.

(SEAL)
Attest:

Edward M. Fletcher, Jr.                    WILLIAM E. SCHUYLER, JR.
Attesting Officer                          Commissioner of Patents